United States Patent
Ding et al.

(10) Patent No.: US 6,914,094 B2
(45) Date of Patent: *Jul. 5, 2005

(54) ENGINEERED POLYOLEFIN MATERIALS WITH ENHANCED SURFACE DURABILITY

(75) Inventors: Rui-dong Ding, Arlington, TX (US); Satchit Srinivasan, Carrollton, TX (US)

(73) Assignee: Solvay Engineered Polymers, Inc., Grand Prairie, TX (US)

( * ) Notice: Subject to any disclaimer, the term of this patent is extended or adjusted under 35 U.S.C. 154(b) by 95 days.

This patent is subject to a terminal disclaimer.

(21) Appl. No.: 10/439,002

(22) Filed: May 16, 2003

(65) Prior Publication Data

US 2003/0204019 A1 Oct. 30, 2003

Related U.S. Application Data

(63) Continuation-in-part of application No. 10/269,888, filed on Oct. 15, 2002, now Pat. No. 6,756,446, which is a continuation-in-part of application No. 10/074,950, filed on Feb. 12, 2002, now Pat. No. 6,509,416, which is a continuation-in-part of application No. 09/672,063, filed on Sep. 29, 2000, now Pat. No. 6,403,721.

(51) Int. Cl.[7] .............................. C08K 3/00; C08K 3/26; C08K 3/34; C08K 11/00; C08L 23/00
(52) U.S. Cl. ................... 524/423; 524/424; 524/425; 524/442; 524/444; 524/445; 524/449; 524/451; 524/500; 524/515; 525/191; 525/201; 525/221; 525/222; 525/240
(58) Field of Search .................. 524/423, 424, 524/425, 442, 444, 445, 449, 451, 500, 515; 525/191, 201, 221, 222, 240

(56) References Cited

U.S. PATENT DOCUMENTS

| | | | |
|---|---|---|---|
| 3,236,917 A | 2/1966 | Natta et al. | |
| 3,264,272 A | 8/1966 | Rees | |
| 4,000,216 A | 12/1976 | Lang | |
| 4,255,540 A | * 3/1981 | Weiss | 525/333.7 |
| 4,393,009 A | 7/1983 | Freitag et al. | |
| 4,480,065 A | 10/1984 | Kawai et al. | 524/418 |
| 4,567,219 A | 1/1986 | Tominaga et al. | 260/998.14 |
| 4,888,391 A | 12/1989 | Domine et al. | 525/221 |
| 4,945,005 A | 7/1990 | Aleckner, Jr. et al. | 428/500 |
| 4,946,896 A | 8/1990 | Mitsuno et al. | 525/93 |
| 4,950,541 A | 8/1990 | Tabor et al. | 428/373 |
| 5,194,509 A | 3/1993 | Hasenbein et al. | 525/285 |
| 5,548,029 A | 8/1996 | Powers et al. | 525/195 |
| 5,883,188 A | 3/1999 | Hwang et al. | 525/71 |
| 5,971,869 A | 10/1999 | Rajagopalan et al. | 473/371 |
| 6,207,761 B1 | * 3/2001 | Smith et al. | 525/221 |
| 6,403,721 B1 | * 6/2002 | Ding et al. | 525/191 |
| 6,509,416 B2 | * 1/2003 | Ding et al. | 525/191 |
| 6,756,446 B2 | * 6/2004 | Ding et al. | 525/191 |

FOREIGN PATENT DOCUMENTS

| | | |
|---|---|---|
| EP | 0 794 225 A1 | 10/1997 |
| JP | 10219040 | 10/1998 |
| WO | WO 93/25617 | 12/1993 |
| WO | WO 97/38050 | 10/1997 |
| WO | WO 00/66642 | 9/2000 |

* cited by examiner

*Primary Examiner*—Nathan M. Nutter
(74) *Attorney, Agent, or Firm*—Winston & Strawn LLP

(57) ABSTRACT

An article formed from a polyolefin resin blend reaction product that includes at least one propylene-based polyolefin-metal salt and at least one property-modifying agent. Optionally, the article includes a polyethylene-based polyolefin-metal salt, thermoplastic elastomer, such as a hydrogenated styrene-butadiene random copolymer or any other styrenic block copolymer, semi-crystalline polyolefin component, or the like, or combinations thereof. Such articles have enhanced scratch and mar resistance while still retaining acceptable impact toughness. Methods of preparing articles and the blends used to form such articles are also part of the invention.

23 Claims, No Drawings

ENGINEERED POLYOLEFIN MATERIALS WITH ENHANCED SURFACE DURABILITY

CROSS REFERENCE TO RELATED APPLICATIONS

This application is a continuation-in-part of application Ser. No. 10/269,888, filed Oct. 15, 2002, now U.S. Pat. No. 6,756,446, which is a continuation-in-part of application Ser. No. 10/074,950, filed Feb. 12, 2002, now U.S. Pat. No. 6,509,416, which is a continuation-in-part of application Ser. No. 09/672,063, filed Sep. 29, 2000, now U.S. Pat. No. 6,403,721. The entire contents of each of the prior applications is incorporated herein by express reference thereto.

FIELD OF THE INVENTION

The invention relates to articles formed from polyolefin resin blends that include a polypropylene-based polyolefin-metal salt component and have superior physical properties including enhanced scratch resistance and rigidity. The invention also relates to the process of manufacturing such articles including the polyolefin resin blends.

BACKGROUND ART

In numerous applications, such as many in the automotive industry, a polymeric material that exhibits a good level of scratch resistance balanced with rigidity and impact toughness is desired. These properties tend to vary, however, such that efforts to enhance one will often result in deterioration of one, or both, of the other beneficial properties.

Polypropylene blends are useful in a wide variety of applications due to their strength, environmental resistance, and processability. While highly crystalline polypropylene does exhibit good mar and scratch resistance, it does not possess the impact toughness required in many important applications such as the making of automobile parts. Special polymeric materials have been developed that overcome this problem to some degree.

Attempts to remedy polypropylene's deficiency in impact toughness by blending with impact modifying copolymers of ethylene and other alpha-olefins, terpolymers of ethylene, other alpha-olefins, and dienes have not been completely successful. Elastomer modified polypropylene blends, also known as thermoplastic polyolefins, have the advantage of improved toughness, especially for cold temperature impact. They are widely used for formed or shaped articles, such as automotive parts, toys, furniture, and housing products. Although the impact toughness of those compositions is improved by these modifiers, the scratch resistance has been found to decrease. That is, the scratch resistance of polypropylene blends containing impact modifiers, such as ethylene-propylene copolymers, ethylene-propylene terpolymers, ethylene-butene copolymers, or ethylene-octene copolymers, is poor.

Increasing the crystallinity of the polypropylene to obtain a harder surface, and/or adding hard mineral filler to these blends, has been attempted as a countermeasure but without complete success. One conventional method to enhance surface characteristics is to use inorganic particulate material. Uniform dispersion of these particulates is difficult to achieve, however, and this tends to result in non-uniform surface properties in such products. The use of these particulates also tends to damage other desirable physical properties of the polyolefin, resulting in loss of impact strength and/or toughness. Debonding of such particulates from the polyolefin system also contributes to stress whitening, which is not desirable.

Another conventional way to enhance surface characteristics of various articles is to apply acrylic polymers or coatings to an article and subsequently cure the polymer or coating with a radiation source, such as ultraviolet radiation.

A method to enhance surface characteristics of polyolefins is described in U.S. Pat. No. 4,000,216, which discloses an extrudable, moldable, or heat formable blend of a thermoplastic polymer and a surface altering agent of at least one monoethylenically unsaturated monomer for said thermoplastic polymer, wherein the surface altering agent has cross-linked polymer particles having an average size of 1 to 30 microns. The surface altering agent is preferably prepared by an endopolymerization, which is used with a compatible polyolefin to be altered.

U.S. Pat. No. 5,880,198 describes thermoplastic resin compositions comprising polypropylene, a styrene containing elastomer, and talc, and having an acceptable balance of toughness and rigidity. The disclosure stresses the importance of the proportions of each component used to achieve this balance. In U.S. Pat. No. 6,384,122, a similar balance of properties is reported for a thermoplastic resin comprising an ethylene-propylene based polymer composition, an ethylene alpha-olefin copolymer based rubber and/or a rubber containing vinyl aromatic compounds and talc. Another example of a composition that provides an acceptable balance of toughness and rigidity is reported in Japanese Patent Application 10219040A for a resin composition consisting of a polyolefin based resin and a block copolymer based on aromatic vinyl and butadiene monomer units. Polymer blends which can be formed or shaped into lightweight and durable articles useful, for example, as automobile parts, toys, housings for various types of equipment, and the like, are well known in the art.

The physical and/or chemical properties of the thermoplastic polyolefin blends can be modified either by blending them with other thermoplastic polymers, or by incorporating into them materials having one or more polar groups, or both. For example, U.S. Pat. No. 4,946,896 describes a thermoplastic polyolefin comprising 20–80 weight percent polypropylene; 5–38 weight percent of an ethylene copolymer consisting of ethylene, an ester unit of either alkyl acrylate or methacrylate, and an unsaturated dicarboxylic acid anhydride; and 5–70 weight percent ethylene-propylene rubber. Similarly, U.S. Pat. No. 4,888,391 describes a polyolefin composition comprising a blend of a polyolefin as the continuous phase with an ethylene/acrylate/acrylic acid terpolymer as a discontinuous phase. These polyolefin-based blends are paintable. Another example of improving both scratch and impact resistance is reported in U.S. Pat. No. 6,423,779, where polypropylene and a polyphenylene oxide resin are blended together with a compatibilizer.

Despite these prior art formulations, there remains a need to obtain polymeric materials that have a good level of mar/scratch resistance along with the physical property requirements of rigidity, strength, processability, and low temperature impact toughness. The present invention provides certain blends that meet these needs.

SUMMARY OF THE INVENTION

The invention relates to an article formed from a polyolefin blend that includes a propylene-based polyolefin-metal salt that is a reaction product of a propylene-containing polymer functionalized with a first hydrophilic moiety and at least one metal ion present in an amount sufficient to at least partially neutralize the first hydrophilic moiety, and a property-modifying agent. In one embodiment, the property-modifying agent is present in an amount sufficient to strengthen the blend. In a preferred embodiment, the propylene-based metal salt is present in an amount of about 1 to 99 weight percent and the property-modifying agent is present in an amount of about 1 to 20 weight percent, with the remainder being one or more polymers or salts thereof, one or more additives, or both, and the total weight percents adding to 100%. In every embodiment described herein, the total amount of material in the polyolefin blend or the article adds up to exactly 100 weight percent.

It is possible to further include ethylene alpha-olefin copolymers, optionally in the form of an ethylene-based polyolefin-metal salt that is a reaction product of a copolymer of ethylene functionalized with a second hydrophilic moiety and at least one metal ion present in an amount sufficient to at least partially neutralize the second hydrophilic moiety. Other optional, but preferable components that can be included separately or in any combination with an ethylene-based polyolefin-metal salt are a semi-crystalline polyolefin, typically in an amount from about 1 to 70 weight percent, a styrenic block ionomer, typically in an amount from about 0.1 to 50 weight percent, or a combination thereof.

The invention also relates to a molded article including the article described above, preferably wherein the propylene-based polyolefin-metal salt is present in an amount sufficient to increase the scratch resistance and clarity of the molded article compared to a molded article that is free of propylene-based polyolefin-metal salt. In another embodiment, the invention relates to an extruded article including the article described above, preferably wherein the propylene-based polyolefin-metal salt is present in an amount sufficient to increase the scratch resistance and clarity of the extruded article compared to an extruded article that is free of propylene-based polyolefin-metal salt. The invention also relates to a thermoformed article including the article described above, preferably wherein the propylene-based polyolefin-metal salt is present in an amount sufficient to increase the scratch resistance and clarity of the thermoformed article compared to a thermoformed article that is free of propylene-based polyolefin-metal salt. The articles of the invention are preferably a coextruded multi-layered sheet or film, or a coating including the polymer blend described above. In one embodiment, the article is in the form of a coextruded multi-layer film or coating, e.g., disposed over a substrate. In a preferred embodiment, the blend forms an outermost layer of the multi-layer film.

In one embodiment, the polymer blend further includes a polymeric metal salt that is a reaction product of a random styrenic copolymer which is comprised of at least one unsaturated dicarboxylic acid derivative incorporated into the styrene backbone; and at least one metal ion present in an amount sufficient to at least partially neutralize each unsaturated dicarboxylic acid derivative. In a preferred embodiment, the random styrenic copolymer includes styrene-maleic anhydride.

In one embodiment, each metal ion used for the neutralization independently includes lithium, sodium, potassium, magnesium, calcium, barium, lead, tin, zinc, aluminum or a combination thereof.

In another embodiment, the first and second hydrophilic moieties each includes an ethylenically unsaturated carboxylic acid monomer. In a preferred embodiment, the first and second hydrophilic moieties each independently include methacrylic acid, acrylic acid, maleic anhydride, or a mixture thereof.

The invention also includes embodiments that further include an impact modifier in an amount sufficient to increase the impact resistance of the polymer blend. In one embodiment, this sufficient amount is about 1 to 20 weight percent. In a preferred embodiment, the impact modifier is present in an amount from about 1 to about 15 weight percent and includes a styrenic block copolymer, an hydrogenated styrene butadiene random copolymer, or mixtures thereof. In one embodiment, the property-modifying agent includes a mineral filler that is present in an amount from about 2 to about 18 weight percent. In a preferred embodiment, the property-modifying agent is a mineral filler present in an amount from about 5 to about 15 weight percent. Preferred mineral fillers include talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof.

In one embodiment, the invention relates to a polymer blend that is essentially free of any ethylene-based metal salt, although one or more other polymer components can be included such as a semi-crystalline polyolefin, styrenic block ionomer, or the like.

In another embodiment, the invention relates to a polymer blend that is essentially free of any styrene-based metal salt, although one or more other polymer components can be included such as a styrenic polymer or copolymer, styrenic block ionomer, or the like. In one preferred embodiment, the polymer blend of the invention is essentially free of both ethylene-based metal salts and styrene-based metal salts.

The property-modifying agent can include, e.g., one or more processing aids, slip agents, oils, waxes, flame retardants, antistatic agents, lubricants, foaming agents, silicone oils, antioxidants, ultraviolet light stabilizers, hindered amine light stabilizers, ultraviolet light absorbers, mineral filler, coloring agents, processing aids, clarifying agents, nucleating agents, or any combination thereof.

The invention also encompasses articles including an appliance cabinet, door liners, countertop, desktop, electrical equipment housing, motor vehicle engine cover (including shrouds), motor vehicle body panel, motor vehicle structural component, bathtub, shower, or agricultural equipment, or any part thereof.

The invention also relates to a method of preparing an article from a polyolefin blend by providing a polymer component including a propylene-based polyolefin-metal salt that is a reaction product of a propylene-containing polymer functionalized with a first hydrophilic moiety and at least one metal ion present in an amount sufficient to at least partially neutralize the first hydrophilic moiety at a sufficiently high temperature to at least partially melt the propylene-based polyolefin-metal salt, and a property-modifying agent, and forming the polymer component into a portion of an article having an external surface, wherein the portion forms a surface of the article that when subjected to a 20 Newton load has less than about a 2.5 on the scratch rating scale and has no ribbing or tearing.

In one embodiment, the method further includes melt blending into the polymer component a polymeric metal salt that is a reaction product of a random styrenic copolymer which is formed from at least one unsaturated dicarboxylic acid derivative incorporated into the styrene backbone and at least one metal ion present in an amount sufficient to at least partially neutralize each unsaturated dicarboxylic acid derivative, and wherein each metal ion independently includes lithium, sodium, potassium, magnesium, calcium, barium, lead, tin, zinc, aluminum or a combination thereof.

In one embodiment, the method further includes providing the polymer component with an impact modifier in an amount sufficient to increase the impact resistance of the article. In one preferred embodiment, the sufficient amount is from about 0.1 to about 20 weight percent. The impact modifier can, e.g., include a styrenic block copolymer, an hydrogenated styrene butadiene random copolymer, or mixtures thereof.

In another embodiment, the method further includes providing the polymer component with property-modifying agent including mineral filler present in an amount from about 2 to about 18 weight percent, preferably about 5 to 15 weight percent that includes talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof.

The invention also relates to an embodiment where the forming of the portion includes co-extruding a multi-layer film adjacent to the remainder of the article, preferably such that the layer including the polymer component forms the external surface of the film and the article rather than one of the internal layers.

DETAILED DESCRIPTION OF THE INVENTION

It has now been discovered that articles including polymeric blends can be obtained that have a superior level of mar/scratch resistance, clarity, or both along with the necessary physical property requirements. These physical property requirements can include rigidity, strength, processability, low temperature impact toughness, or any combination thereof. The present invention provides these articles including polymeric blends by forming a reaction product of a propylene-based polyolefin-metal salt that is a reaction product of a propylene-containing homopolymer or copolymer and at least one organic monomer containing at least one hydrophilic moiety, the reaction product being at least partially neutralized with at least one metal ion. Optionally, the polymeric blend can include a semicrystalline polyolefin, a styrenic block ionomer optionally including a polymeric metal salt, a polyethylene-based metal salt, or any combination thereof.

It is now believed, without being bound by theory, that improved polymer blends can be prepared that include propylene-based polyolefin-metal salts. The physical properties of heterogeneous polymer blends are governed by the interfacial interactions between different phases. It is believed that propylene-based polyolefin-metal salt permits dispersion of any additional components of the composition, and increases interfacial interactions leading to surprisingly superior reinforcement without negatively affecting toughness. These interactions significantly influence blend morphology, dispersion, and distribution of polymer phases. The inclusion of propylene-based polyolefin-metal salts, such as with polypropylene, ethylene-based polyolefin-metal salts, other polymeric components, or any combination thereof, in a polymer blend significantly improves the interfacial strength of the polymer phases, due probably to ionic bonding, and yields a thermoplastic resin with an excellent balance of scratch resistance, stiffness, and impact resistance.

The propylene-based polyolefin-metal salt is present in an amount of about 0.1 weight percent to about 99 weight percent, preferably about 1 weight percent to about 99 weight percent, and more preferably about 20 weight percent to about 98 weight percent of the blend composition. In one embodiment, the propylene-based polyolefin-metal salt is present in an amount of about 40 to 95 weight percent, while in another embodiment it is present in about 60 to 90 weight percent of the composition. The same total concentrations apply to embodiments incorporating copolymers of propylene and carboxylic acid or anhydride monomers, or propylene-containing polymers grafted with a functional group that are partially substituted for propylene-based polyolefin metal salts. These substitutions will typically be less than about 20 percent, preferably less than about 10 percent, of the total propylene-based polyolefin-metal salt.

The propylene-based polyolefin-metal salts of this invention have a backbone of a homopolymer or one or more copolymers of propylene and up to about 20 mole percent ethylene or other alpha-olefins having up to about 12 carbon atoms. If a copolymer, this polyolefin backbone can be random, block or graft with a $C_2$ to $C_{20}$ alpha olefin. For example, the copolymer can be at least one other olefin, for example, ethylene; 1-butene; 1-pentene; 1-hexene; 2-methyl-1-propene; 3-methyl-1-pentene; 4-methyl-1-pentene; 3,3-dimethyl-1-butene; 2,4,4-trimethyl-I-pentene; 5-methyl-1-hexene; and/or 1,4-ethyl-1-hexene; or mixtures thereof. If a copolymer, this polyolefin backbone can be random, block or graft. At least a fraction of this polyolefin backbone is preferably grafted with an unsaturated organic compound containing at least one site of unsaturation and at least one carbonyl or carboxyl or other hydrophilic group.

When included, these functional moieties are added to the polyolefin backbone in an amount of at least about 0.01 weight percent, preferably at least about 0.1 weight percent, and more preferably at least about 0.5 weight percent, based on the combined weight of the polymer and the hydrophilic organic compound. The maximum amount of unsaturated organic compound content can vary as desired, but typically it should be no more than about 25 weight percent, often it should be no more than about 10 weight percent, and in certain preferred cases it should be no more than about 5 weight percent, based on the combined weight of the polymer and organic compound. Typical polyolefin-metal salts include P/Y copolymers, where: P is the olefinic backbone, such as propylene; and Y is the functional comonomer, such as acrylic or methacrylic acid, present in an amount of about 0.01 percent to about 20 weight percent, preferably about 0.5 percent to about 5 weight percent, of the polymer.

An unsaturated hydrophilic organic compound can be grafted to the base polypropylene polymer herein by any technique known to one of ordinary skill in the art, such as those taught in U.S. Pat. No. 3,236,917 and U.S. Pat. No. 5,194,509, both of which are incorporated herein by express reference thereto. For example, in the '917 patent, the base polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g., 210° to 300° C., and a free radical initiator is not used.

An alternative method of grafting is taught in U.S. Pat. No. 4,950,541, the disclosure of which is also incorporated herein by express reference thereto, by using a twin-screw devolatilizing extruder as the mixing apparatus. The base polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

Any hydrophilic monomer that can be neutralized, such as unsaturated carboxylic acid monomers, can be used in the manufacture of functionalized polyolefins of this invention. Representative unsaturated organic compounds that include at least one carbonyl group include the ethylenically unsaturated carboxylic acids, anhydrides, esters, and their salts, both metallic and nonmetallic, and combinations thereof. Preferably, the organic compound includes ethylenic unsaturation conjugated with the carbonyl group. Representative compounds include maleic, fumaric, acrylic, methacrylic, itaconic, crotonic, alpha-methyl crotonic, cinnamic, and the like, acids and their anhydride, ester and salt derivatives, if any, and any combinations thereof. Preferred combinations of functionalizing compounds include those such as acrylic acid/methacrylic acid mixtures. Preferably, maleic anhydride, acrylic acid, methacrylic acid, or combinations thereof are used.

The functionalized polymer, or "reaction product" thereof, is then advantageously neutralized with at least one metal ion, typically an alkali or alkaline-earth containing compound, typically a salt or a base, to form the functionalized polyolefin-metal salts. Preferably, the acid moiety (or moieties) on each of the ionomers and functionalized polyolefin-metal salt in a blend of this invention is (are) neutralized about 30 to 100 percent, preferably at least about 40 percent, more preferably at least about 60 percent. The acid moiety is preferably neutralized with one or more alkali or alkaline earth metals, but other cations, or blends thereof, can be used. Examples of suitable cations include lithium, sodium, potassium, magnesium, calcium, barium, lead, tin, zinc, aluminum, or a combination of such cations. The preferred cations are zinc, lithium, sodium, calcium, magnesium, or a combination thereof. These cations are preferably added as bases to increase the degree of neutralization of acid moieties. Examples of metal-ion containing compounds include sodium carbonate, zinc acetate dihydrate, zinc oxide, zinc hydroxide, calcium oxide, calcium hydroxide, magnesium oxide, magnesium hydroxide, zinc stearate, calcium stearate, or combinations thereof. The metal-ion containing compounds include at least about 0.01 weight percent and no more than 20 weight percent of the compound of the present invention. In one preferred embodiment, the metal-ion containing compounds includes about 0.01 weight percent to no more than 10 weight percent, while in another embodiment they are present in an amount of about 5 weight percent to no more than 20 weight percent.

In one embodiment, the polyolefin resin blends further include at least one of: semi-crystalline polyolefin homopolymers and/or copolymers, ethylene-based polyolefin-metal salts, styrenic block ionomers, and the like, and any combination thereof. In a preferred embodiment, each of these components will be included in a polyolefin blend of the invention. Preferably the polyolefin homopolymers and/or copolymers are predominantly polypropylene or polyethylene.

The optional semi-crystalline polyolefin resin component, when included, can be present in an amount of about 10 to about 90 weight percent, preferably about 15 to about 85 weight percent, and more preferably about 20 to about 40 weight percent, of the composition and is chosen from one or more of homopolymers of propylene, homopolymers of ethylene such as polyethylene, low density polyethylene, or high density polyethylene, copolymers of propylene and at least one other $C_2$ to $C_{20}$ alpha-olefin, copolymers of ethylene and at least one other $C_3$ to $C_{20}$ alpha-olefin, or mixtures thereof. Preferred alpha-olefins for such propylene and/or ethylene copolymers include ethylene, 1-butene, 1-pentene, 1-hexene, methyl-1-butenes, methyl-1-propenes, methyl-1-pentenes, methyl-1-hexanes, ethyl-1-hexenes, 1-octene, and 1-decene, or combinations thereof.

It is believed that polypropylene has excellent resistance to scratch and mar due in part to its high crystallinity. Pure polypropylene alone, however, has low impact resistance. Conventionally, the addition of elastomers such as ethylene- or styrene-containing copolymers improves impact strength, but tends to markedly worsen scratch and mar resistance. Thermally reversible ionic cross-linking of styrenic ionomers permits excellent entropic recovery after deformation, which provides enhanced mar and scratch resistance in polyolefin blends compared to blends containing non-ionomeric styrene polymers or even no styrenic component at all.

It is now believed, without being bound by theory, that the combination of semi-crystalline polyolefins, styrenic ionomers, or both can further enhance the physical properties of a variety of the propylene-based polyolefin-metal salts of the invention. The physical properties of the heterogeneous polymer blends are governed by the interfacial interactions between different phases. It is believed that such combinations can enhance dispersion of the blend composition, and increase interfacial interactions, leading to increased toughness in certain blends of the invention. These interactions significantly influence blend morphology, dispersion, and distribution of polymer phases. The combination of propylene-based polyolefin-metal salts with a semi-crystalline polyolefin, styrenic ionomer, polyethylene-based metal salt, or some combination thereof in a blend significantly improves the interfacial strength of the polymer phases, due probably to ionic bonding, and yields a thermoplastic resin with an excellent balance of scratch resistance, stiffness, and impact resistance according to the invention.

Propylene homopolymers or copolymers are preferred in one embodiment of the semi-crystalline polyolefin resin, i.e., copolymers having at least 50 weight percent propylene content in the polymer chain itself. Suitable propylene homopolymers and copolymers are commercially available, for example, as PRO-FAX from Basell North America, Inc. of Wilmington, Del., and as FORTILENE, HP/P 9000, ACCTUFF or ACCPRO from British Petroleum Chemicals of Houston, Tex. The propylene-based polyolefin-metal salt can also include these or any other suitable propylene-based homopolymers or copolymers. Suitable ethylene homopolymers and copolymers are commercially available, for example, as ALATHON from Equistar Chemicals of Houston, Tex., as MARLEX from Chevron Phillips of Houston, Tex., as FORTIFLEX from Solvay America of Houston, Tex., and as ESCORENE from ExxonMobil of Houston, Tex.

The optional styrenic block ionomer, when included, is typically present in an amount from about 0.1 weight percent to about 50 weight percent, preferably from about 1 weight percent to about 45 weight percent, and most preferably from about 2 weight percent to about 40 weight percent of the composition.

The styrenic block ionomer is chosen from, e.g., unsaturated or saturated (i.e., hydrogenated or nonhydrogenated) styrenic block copolymers functionalized with at least one polar group, and the functionalized block copolymer is at least partially neutralized with a metal ion. Styrenic block copolymers useful in providing styrenic block ionomers include a styrenic block segment and an elastomeric block segment that can optionally, but in one embodiment preferably, be hydrogenated. The structure of the styrenic block segment can be of the linear or radial type, and of the diblock, triblock, or branched type. The styrenic block segment is preferably a polymer of styrene and/or its analogs and homologs, including alpha-methylstyrene, and ring-substituted styrenes, particularly ring-methylated styrenes. The preferred styrenics are styrene and alpha-methylstyrene, with styrene being especially preferred. The elastomeric block segment of the above styrenic block copolymer may be ethylene, butylene, butadiene, isoprene, propylene, or a combination thereof. Preferred styrenic block copolymers include those described below.

Among the polar groups that may be reacted or combined with such styrenic block copolymers to produce a functionalized styrenic block copolymer useful in the present invention are those previously discussed for functionalizing the propylene-based metal salts of the invention. These can be independently selected to be the same or different from the propylene-based metal salt functionalizing group(s). Exemplary styrenic block copolymers functionalized with polar groups are described in U.S. Pat. No. 4,578,429, U.S. Pat. No. 4,868,245, and U.S. Pat. No. 4,968,754, which are incorporated herein by express reference thereto. For example, polar groups can be included in an amount of about 0.1 to 10 weight percent of the total polyolefin resin.

Such styrenic block copolymers functionalized with a polar group are commercially available, for example, as KRATON from Kraton Polymers of Houston, Tex., as SEPTON from Kuraray Company Ltd. of Pasadena, Calif., and as TUFTEC from Asahi America Inc. of Malden, Mass.

Another optional component that can be included in the invention is a polymeric metal salt component that is a reaction product of a random styrenic copolymer which includes an unsaturated dicarboxylic acid derivative incorporated into a styrene or other polymeric backbone, which reaction product is at least partially neutralized with at least one metal ion. Alternatively, the polymeric metal salt is a random terpolymer of styrene, butadiene, and an unsaturated dicarboxylic acid derivative, or a reaction product thereof, which is at least partially neutralized with at least one metal ion. In one embodiment, the polymeric metal salt can include both the random styrenic copolymer reaction product and the neutralized random terpolymer. The preferred styrenic materials include styrene and alpha-methylstyrene, with styrene being especially preferred. Examples of a suitable unsaturated dicarboxylic acid derivative includes maleic acid, maleic anhydride, fumaric acid, mesaconic acid, itaconic acid, itaconic anhydride, and monomethyl maleate, or any combination thereof.

Procedures for preparing such random styrenic copolymers are known in the art and have been described in, for example, U.S. Pat. No. 2,971,939. Impact-modified versions can be produced for use according to the invention, for example, by copolymerizing the styrenic components and the unsaturated dicarboxylic acid derivative components in the presence of polybutadiene. Styrene-maleic anhydride copolymers, for example, are commercially available as DYLARK from Nova Chemicals Corporation of Calgary, Alberta, Canada, as CADON from Bayer Corporation of Pittsburgh, Pa., and as STAPRON from DSM Engineering Plastic Products, Inc. of Reading, Pa.

The reaction product of a random styrenic copolymer, which includes a polar group incorporated into the optional styrene backbone, is then advantageously at least partially neutralized with at least one metal ion, typically an alkali or alkaline-earth containing compound, for example a salt or a base, to form the styrenic ionomer(s). In a preferred embodiment, the polar group includes one or more unsaturated dicarboxylic acid derivatives. Preferably, each type of polar group is neutralized about 30 to 100 percent, more preferably at least about 40 percent, and most preferably at least about 60 percent. The metal ions may be selected from the group previously described herein.

A method for ionizing a modified block copolymer is taught in U.S. Pat. No. 4,972,020, which is incorporated herein by express reference thereto. In the '020 patent, aluminum hydroxide and a maleic anhydride grafted hydrogenated block copolymer are melt blended in a Brabender Plastograph at 200° C. for 5 minutes to form an ionically crosslinked modified block copolymer. Such reactions may be carried out in situ during extrusion of the blend in a twin-screw extruder. Alternatively, such reactions may be performed in a one-step process using functionalized styrenic block copolymer salts, polymeric metal salts, styrenic block ionomers, or mixtures thereof.

The optional random styrenic copolymer included with or in a propylene-based metal salt can include an unsaturated dicarboxylic acid derivative incorporated into the propylene backbone, or a styrenic block copolymer functionalized with at least one polar group, which forms the basis of the styrenic ionomer and/or the functionalized polyolefin that is included in a blend with the propylene-based polyolefin-metal salt, can be subsequently sulfonated before the optional neutralization step with a metal ion. Techniques for sulfonating polymers are well known to those of ordinary skill in the art, such as the one taught in U.S. Pat. No. 4,184,988, which is incorporated herein by express reference thereto. In the '988 patent, acetyl sulfate was added to a solution of EPDM and heptane; the reaction was terminated after 1 hour with the addition of isopropyl alcohol. This optional step results in a polymer containing both sulfonated and carboxylated groups, and this is preferred in one embodiment.

In one embodiment, the random styrenic copolymer of ethylene and styrene used with a propylene-based metal salt can have a random distribution of blocks of a plurality of monomer units. This type of polymer can be manufactured by single-site catalysis, i.e., metallocene or single-site non-metallocene catalysis. The random styrenic copolymer including ethylene and styrene is present in an amount from about 0.1 to 40 percent, more preferably from about 1 to 20 percent, and even more preferably about 5 to 15 percent of the overall polyolefin blend.

In another embodiment, the optional polyolefin resin blends when used with a polypropylene-based metal salt can further include polypropylene or polyethylene homopolymers and/or copolymers, or mixtures thereof, and/or copolymers of propylene and carboxylic acid or anhydride monomers, and styrenic block ionomer formed from SEBS modified with a polar group, which modified SEBS is then at least partially neutralized with at least one metal ion.

In yet another embodiment, the optional polyolefin resin blends can further include a semi-crystalline polyolefin and a reaction product of a styrenic block copolymer functionalized with at least one polar group, in particular carboxylic acids, and optionally a reaction product of a random styrenic copolymer which includes an unsaturated dicarboxylic acid derivative incorporated into the styrene backbone, each reaction product separately or concurrently being at least partially neutralized with at least one metal ion.

In one embodiment, the polyolefin resin blend can include copolymers of propylene and carboxylic acid or anhydride monomers substituted for some of the propylene-based polyolefin-metal salts. In yet another embodiment, the polyolefin resin blend optionally further includes a polymeric metal salt including random styrenic copolymers which are comprised of an unsaturated dicarboxylic acid derivative incorporated into the styrene backbone.

In one embodiment the functionalized polymers are exclusively propylene-based polyolefin-metal salts and styrenic block ionomers, which have been formed as reaction products when propylene-based functionalized polyolefins and styrenic block copolymers grafted with at least one functional group are at least partially neutralized with at least one metal ion. In another embodiment the functionalized polymers are exclusively propylene-based polyolefin-metal salts and polymeric metal salts, which have been formed as reaction products when propylene-based functionalized polyolefins and, optionally, random styrenic copolymers which include an unsaturated dicarboxylic acid derivative incorporated into the styrene backbone, are at least partially neutralized with at least one metal ion.

In one embodiment, the functionalized polyolefins are exclusively ethylene-based polyolefin-metal salts and propylene-based polyolefin-metal salts, which have been formed as reaction products when ethylene-based functionalized polyolefins and propylene-based functionalized polyolefins are at least partially neutralized with a metal ion.

In another embodiment, the propylene-based polyolefin-metal salt blends of the invention are preferably essentially free of ethylene-based polyolefin metal salts (i.e., ethylene-based ionomers), essentially free of styrene-based polyolefin metal salts (i.e., styrene-based ionomers), or essentially free of both. The term "essentially free," as used herein, means that the polymer component including polypropylene-based metal salt and property-modifying agent has less than about 10 weight percent of the limited material, e.g., ethylene-based polyolefin metal salts, preferably less than about 5 weight percent, and more preferably less than about 1 weight percent of the stated material, e.g., ethylene-based polyolefin metal salts. In one preferred embodiment, "essentially free" means less than 0.1 weight percent of such an ethylene-based metal salt, styrene-based metal salt, or both. "Completely free" means no more than a trace amount of any such materials, preferably no detectable amounts.

In one embodiment, it is preferred that the propylene-based polyolefin-metal salts and optionally ethylene-based polyolefin-metal salts be formed from semi-crystalline homopolymers of propylene and ethylene, respectively. The resulting propylene-based polyolefin-metal salts component, optionally also including ethylene-based polyolefin-metal salts, may be semi-crystalline as defined above.

A component that is optionally, but preferably, present in a blend with the propylene-based metal salt blend is an impact modifier. This is preferably a thermoplastic elastomer including one or more styrenic block copolymers. Acceptable styrenic block copolymers include, but are not limited to, copolymers of styrene, ethylene and another alkene. Exemplary copolymers include styrene-ethylene/butylene, styrene-ethylene/butylene-styrene, styrene-ethylene/propylene, styrene-ethylene/propylene-styrene, styrene-ethylene/propylene-styrene-ethylene-propylene, styrene-butadiene, styrene-butylene-styrene, styrene-isoprene-styrene, and hydrogenated variations or any combinations thereof. Suitable styrenic block copolymers also include styrene-butadiene-styrene, styrene-butene-butadiene-styrene, alpha-methylstyrene-butadiene-alpha-methylstyrene, alpha-methylstyrene-isoprene-alpha-methylstyrene, and the like, or combinations thereof. The structure of the styrene block copolymers useful in the present invention can be of the linear or radial type, and of the di-block or tri-block type. In some embodiments the styrenic block copolymers having at least four different blocks or a pair of two repeating blocks, for example, repeating styrene/butadiene or styrene/ethylene propylene blocks, can also be desirable.

The rubber portion of the styrene block copolymer may be either unsaturated or saturated. Block copolymers with unsaturated rubber monomer units may include homopolymers of butadiene or isoprene and copolymers of one or both of these two dienes with a minor amount of styrenic monomer. When such a block is hydrogenated, the resulting product is, or resembles, a regular copolymer block of ethylene and 1-butene. If the conjugated diene employed is isoprene, the resulting hydrogenated product is or resembles a regular copolymer block of ethylene and propylene. Hydrogenation of block copolymers with unsaturated rubber monomer units may be effected by use of a suitable catalyst component.

The impact modifier styrenic block copolymer component, when used, can make up from about 0.1 to about 40 weight percent, more preferably from about 1 to about 20 weight percent, and in one embodiment even more preferably about 5 to about 15 weight percent of the overall polyolefin blend. Of course, quantities less than 0.1 weight percent can be used but will have minimal effect on the properties of the blend.

An hydrogenated styrene butadiene random copolymer may be used in place or in addition to the styrenic block copolymer as an impact modifier, and is optionally, but in one embodiment preferably, present in an amount from about 0.1 to about 40 weight percent, more preferably from about 1 to about 20 weight percent, and even more preferably about 5 to about 15 weight percent of the overall polyolefin resin blend. The same types of styrenic block or random copolymers can be used as previously noted for styrenic metal salts or functionalized styrenic compounds.

Another optional component present in a preferred embodiment of the polyolefin blend of the present invention is a toughening component of semi-crystalline or random copolymers of ethylene, preferably functionalized, and an alpha-olefin, optionally including at least one nonconjugated diene. Suitable alpha-olefins include, for example, an alpha-olefin of 3 to about 20 carbon atoms (e.g. 1-butene, 1-hexene, 4-methyl-1-pentene, 1-heptene, 1-octene, styrene, etc.), preferably of 3 to 10 carbon atoms, and most typically these polymers include ethylene and one or more of 1-butene, 1-hexene, or 1-octene. For example, propylene, butene or octene are particularly useful in certain embodiments, while in others a copolymer including ethylene and octene is preferred. Again, the hydrophilic component can be added in types and in concentration ranges like those described for other ionomers.

The concentration of these ionomers or functionalized polyolefins of ethylene and high alpha-olefin copolymers, when included, can be from about 1 percent to 20 percent, preferably from about 5 percent to 15 percent, of the polyolefin blend. These ionomers, when used, are added to the blend of the components discussed above.

The optionally included random noncrystalline copolymer of ethylene and alpha-mono-olefins, such as propylene, are rubbery toughening agents. The toughening component useful in the practice of the invention will typically include from about 30 to 90 weight percent, preferably from about 40 to 80 weight percent, and more preferably from about 50 to 70 weight percent of a first olefin monomer (preferably ethylene) and from about 10 to 70 weight percent, preferably from about 20 to 60 weight percent, and more preferably from about 30 to 50 weight percent of a second alpha-olefin (preferably 1-hexene or 1-octene).

The random copolymer also includes a terpolymer of noncrystalline rubbery copolymer of two or more olefins, such as ethylene and propylene, and a lesser quantity of at least one nonconjugated diene. Although any suitable nonconjugated dienes can be used, the dienes are preferably straight chain dienes; cyclic dienes; bridged cyclic dienes; or a combination thereof. Preferred straight chain dienes include 1,4-hexadiene. Preferred cyclic dienes include cyclooctadiene or dicyclopentadiene. Preferred bridged cyclic dienes include ethylidene norbornene. When dienes are used, any $C_4$ to $C_{18}$ alkene can be used. A preferred diene for use in such terpolymers is ethylidene norbornene.

The copolymer toughening component, particularly when at least one diene is present, that can be present will typically include from about 30 to 90 weight percent, preferably from about 40 to 80 weight percent, and more preferably from about 50 to 70 weight percent of a first olefin monomer (i.e., ethylene); typically from about 10 to 70 weight percent, preferably from about 20 to 60 weight percent, and more preferably from about 30 to 50 weight percent of a second alpha-olefin, and typically from about 0.5 to 20 weight percent, preferably from about 1 to 12 weight percent, and more preferably from about 3 to 8 weight percent of nonconjugated diene. When the copolymer includes at least one diene, the amount present is not typically critical and values as low as about 0.5 percent of diene can be useful.

Compounds suitable as toughening components are commercially available from Exxon Chemical Americas of Houston, Tex., as VISTALON 404, 2727, 808 or 878, from Uniroyal Chemical, Division of Crompton Corporation of Middlebury, Conn., as ROYALENE 521, 552 or 580, and from Dupont Dow Elastomers LLC of Wilmington, Del., as NORDEL 4640, 2744 or 3730P. The toughening component includes (A) a copolymer of ethylene and another alpha-olefin or (B) a copolymer of ethylene, another alpha-olefin, and a diene. This toughening component adds toughening properties to the composition and improves the impact resistance of the blends.

The copolymers, including terpolymers, used in the optional toughening component of the present invention can be made according to any of the various means known to the ordinary-skilled artisan in this field, such as by addition free radical polymerization, cationic or anionic polymerization, or catalyst driven polymerization, to name but a few. As the ordinary-skilled artisan in this field knows, each of these different methods can be used to produce different types of copolymers having two or more units, such as graft polymers, block polymers, random polymers, etc., as desired.

This optional toughening component, when included, can be present in an amount of up to about 40 percent of the overall composition, preferably from about 1 to 25 percent, and even more preferably from about 8 to 20 percent. An exemplary polyolefin blend might include: a reaction product of a propylene-containing polymer functionalized with a hydrophilic moiety, in particular carboxylic acids, that is at least partially neutralized with a metal ion; an ethylene-based ionomer and/or a reaction product of an ethylene-containing polymer functionalized with a hydrophilic moiety, in particular carboxylic acids, that is at least partially neutralized with a metal ion; optionally, a semi-crystalline propylene-containing polymer; propylene and an alpha-olefin copolymer, i.e., an ethylene-propylene copolymer; optionally, an ionomer of ethylene and high alpha-olefin monomers or a functionalized polyolefin that is a reaction product of ethylene/high alpha-olefin polymers functionalized with a hydrophilic moiety, in particular carboxylic acids, and neutralized with a metal; optionally, a toughening component including semi-crystalline copolymers of ethylene and alpha-olefin, optionally including at least one diene; and optionally, an interfacial modifier or toughener, for example a thermoplastic elastomer, such as a styrenic block copolymer.

In an embodiment, the polyolefin blend includes copolymers of propylene and carboxylic acid monomers substituted for some of the propylene-based polyolefin-metal salt(s). In another embodiment, the polyolefin blend includes ethylene ionomers, ethylene-based polyolefin-metal salts, or both, with the propylene-based metal salt of the invention. These ethylene components can be grafted with a functional group. The polyolefinic ionomer can include P/X/Y copolymers, where: P is the olefinic comonomer, such as propylene or propylene and ethylene; X is a softening comonomer, such as acrylate or methacrylate present in an amount of up to about 10 percent, preferably up to about 2 percent of the polymer; and Y is the functional comonomer, such as acrylic or methacrylic acid, present in an amount of about 0.01 percent to 20 percent, preferably about 0.5 percent to 5 percent, of the polymer ionomer resins, for example those sold under the trademark SURLYN™ by E.I. DuPont de Nemours and Co. of Wilmington, Del., are suitable for use in the blends. These ionomer resins are a copolymer of an olefin and an alpha, beta-ethylenically unsaturated carboxylic acid with 10 to 90 percent of the carboxylic acid groups neutralized by a metal ion. See, e.g., U.S. Pat. No. 3,264,272. Commercially available ionomer resins typically include copolymers of ethylene and methacrylic or acrylic acid. These ionomer resins are generally distinguished by the type of metal ion, the amount of acid, and the degree of neutralization.

Suitable ethylene ionomers include, but are not limited to, ethylene/acrylic acid ionomers, ethylene/methacrylic acid ionomers, ethylene/acrylic acid/n-butyl acrylate ionomers, ethylene/methacrylic acid/iso-butyl acrylate ionomers, ethylene/acrylic acid/iso-butyl acrylate ionomers, ethylene/methacrylic acid/n-butyl methacrylate ionomers, ethylene/acrylic acid/methyl methacrylate ionomers, ethylene/acrylic acid/methyl acrylate ionomers, ethylene/methacrylic acid/methyl acrylate ionomers, ethylene/methacrylic acid/methyl methacrylate ionomers, ethylene/acrylic acid/n-butyl methacrylate ionomers, and combinations thereof.

The manner in which the ionomers are made is known in the art. The ionomer can be made by adding organic monomer including a hydrophilic moiety, also called an ionic monomer, to the composition during the manufacture of the blends of the polypropylene-based metal salt blend of the invention.

Suitable ethylene-containing polymers grafted with a functional group include, but are not limited to, ethylene/acrylic acid, ethylene/methacrylic acid, ethylene/acrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, ethylene/acrylic acid/n-butyl methacrylate.

Such ethylene-containing polymers grafted with a functional group are commercially available, for example those sold under the trademark NUCREL by E.I. DuPont de Nemours and Co. of Wilmington, Del. Acrylic acid, methacrylic acid, maleic anhydride, itaconic acid, and the like may under some circumstances be added to the ethylene and/or propylene monomers during the polymerization of the polyethylene and/or copolymers of propylene and carboxylic acid monomers, respectively.

The polyolefin resin blends can optionally include other property-modifying agents to the extent that the presence of such agents does not interfere with the performance of the compositions, e.g., the scratch and mar resistance, and, in some cases, the impact toughness and/or paintability. For instance, examples of optional property-modifying agents include processing aids, such as calcium stearate; slip agents; oils; waxes; flame retardants; antistatic agents; lubricants; foaming agents; silicone oils; primary antioxidants, such as IRGANOX 1010 or 1076 phenolic antioxidants (available from Ciba Specialty Chemicals of Tarrytown, N.Y.), secondary antioxidants such as IRGANOX 168 phosphite (available from Ciba) or SANDOSTAB PEPQ phosphonite (available from Clariant Corporation of Charlotte, N.C.) or Ultranox phosphite (available from General Electric Specialty Chemicals of Parkersburg, W.Va.); ultraviolet light stabilizers, such as carbon black; hindered amine light stabilizers such as Tinuvin and Chimassorb brands (available from Ciba Specialty Chemicals of Tarrytown, N.Y.); and ultraviolet light absorbers such as benzotriazole-based Tinuvin brands (available from Ciba Specialty Chemicals of Tarrytown, N.Y.); and benzophenone-based Cyasorb brands (available from Cytec Industries of Stamford, Conn.); or any combination thereof. Another class of modifying ingredients are color concentrates such as organic or inorganic pigments or special effect pigments such as metallic flakes or pearlescent pigments, which when optionally included are typically present at concentrations ranging from about 0.01 to about 10 percent, typically from about 1 to about 5 percent.

Another example of a preferred class of property-modifying agents includes mineral fillers. The mineral filler can be a treated or untreated inorganic material, such as talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fibers, carbon fibers, clay, or a combination thereof. The mineral filler can optionally be present in an amount from about 0.1 to about 20 weight percent of the overall composition, typically from about 1 to 18 weight percent. When included, the mineral filler is preferably present in an amount from about 2 to about 15 weight percent. It should be understood that one or more classes or species within each type of property-modifying agent can be included within a single property-modifying agent according to the invention.

The property-modifying agents together, including fillers, coloring agents, processing aids, clarifying agents, nucleating agents, antioxidants, and the like, are preferably present in an amount of about 0.01 to 20 weight percent, preferably about 1 to 20 weight percent. In one embodiment, the modifying agents together can be present in an amount of about 2 to 17 weight percent. In alternative amounts, the combined modifying agents can be included in amounts of about 1 to 5 weight percent, 5 to 10 weight percent, 10 to 15 weight percent, or 15 to 20 weight percent, of the total composition.

Each optional property-modifying agent can be admixed with the other ingredients during manufacture of the blend. The present invention includes a method of manufacture of the above blends by, for example, extrusion. The polyolefin resin blends of this invention are mixed by any conventional manner that insures the creation of a relatively homogeneous blend. Optional ingredients can also be prepared in the form of a masterbatch with one or more of the other primary or optional ingredients of the invention.

The polypropylene-based polyolefin resin blends of the present invention have excellent scratch resistance, high rigidity, and toughness. It is preferred that these blends are also paintable.

Various known methods of forming thermoplastic materials may be employed to form articles from the compositions of the current invention. Examples of suitable processes include, without limitation, compression molding, extrusion or co-extrusion, thermoforming, and injection molding. The present compositions are formulated to have a melt flow appropriate for the molding or forming equipment used. Some of these methods are further described herein.

One method of manufacturing propylene-based polyolefin-metal salts includes the steps of contacting a propylene-containing polymer and at least one organic monomer containing at least one hydrophilic moiety under conditions such that the propylene polymers are functionalized with each hydrophilic moiety, and neutralizing the reaction product with at least one type of metal ion.

One method of manufacturing styrenic block ionomers for use in the polymeric blends includes contacting a styrenic block copolymer and at least one polar group under conditions such that the styrenic block copolymers are functionalized with each polar group, and neutralizing the reaction product with one or more types of metal ions to form a styrenic block ionomer. The step of neutralizing the functionalized styrenic block copolymer with metal ion(s) can be accomplished approximately at the same time as the blending with the polyolefins. In one embodiment, an already functionalized propylene-containing polymer can be added as a separate component.

The manufacture of propylene-based polyolefin-metal salts and any optional polymeric components can be performed in a single reaction mass. Optionally, such reactions may also be performed in a one-step process using one or more functional oligomeric salts.

The method of manufacturing a polyolefin resin blend of the invention includes providing propylene-based polyolefin-metal salt(s), providing any optional polymeric components including semi-crystalline polyolefin resins, styrenic block ionomers, or the like, and blending the components to make a homogenous blend.

The functionalized polypropylene-metal salt and any optional additional polyolefin-metal salts or styrenic block ionomers may be formed continuously and simultaneously via melt blending of the primary components of the present invention (e.g., the propylene-containing polymer functionalized with a hydrophilic moiety and the metal-ion containing component). Techniques for melt blending of a polymer with optional additives of all types are known in the art and can typically be used in the practice of this invention. Typically, in a melt blending operation useful in the practice of the present invention, the individual components of the composite are combined in a mechanical extruder or mixer, and then heated to a temperature sufficient to form a polymer melt. The mechanical mixer can be a continuous or batch mixer. Examples of continuous mixers are single screw extruders, intermeshing co-rotating twin screw extruders such as Werner & Pfleiderer ZSK™ extruders, counter-rotating twin screw extruders such as those manufactured by Leistritz™, and reciprocating single screw kneaders such as Buss™ co-kneaders. Examples of batch mixers are lateral 2-roll mixers such as Banbury™ or Boling™ mixers.

The polyolefin resin blend may be prepared by shear mixing the components of the present invention in the melt at a temperature equal to or greater than the melting point of the polyolefin. "Melting point" is defined as the first order transition temperature at which a crystalline solid changes from a solid state to a fluid state. The temperature of the melt, residence time of the melt within the mixer, and the mechanical design of the mixer are several of the variables that control the amount of shear to be applied to the composition during mixing to provide a suitable polyolefin resin blend according to the invention.

In a preferred embodiment, the polyolefin resin blend is prepared by mixing the propylene-containing polymer functionalized with a hydrophilic moiety, the metal-ion containing component, and any other optional polymeric or other components, in a modular intermeshing co-rotating twin-screw extruder, such as those manufactured by Leistritz™. Other manufacturers of similar suitable types of equipment include co-rotating twin screw extruders from Berstorff™, Werner and Pfleiderer™, Japanese Steel Works, and others. The screw diameter for this type of mixer may vary from about 25 to 300 mm. Without being bound by theory, commercially viable production rates of the final polymer blend of the current invention should be achievable with screw diameters of at least about 70 mm.

A description of a conventional extruder can be found in U.S. Pat. No. 4,857,600, which is incorporated herein by express reference thereto, and includes a series of sections, or modules, which perform certain mixing functions on the composition. The polyolefin resin blend components are fed into the initial feed section of the extruder at the main feed hopper. Other ingredients, such as fillers, thermal stabilizers, and others as described above, may also be fed into the main feed hopper of the mixing extruder as dry powders or liquids.

The components of the polyolefin resin blend are preferably homogenized with an initial melting and mixing section of the extruder. The polymer melt temperature is raised by a sequence of kneading blocks to just above the highest softening point of the polymer blend. Within this first mixing section of the extruder, it is desirous to maintain the polymer temperature above the melting point of the polymer blend within the time frame of the melting process of about 5 to 20 seconds. Although any suitable melt temperature can be used depending on the melting point of the polymeric materials being blended, a melt temperature of about 160° C. to 250° C. is preferred for the first mixing section.

Subsequent to the first mixing section, there is a second mixing section of the extruder to perform kneading and distributive mixing to ensure sufficiently uniform distribution of the components of the polyolefin resin blend. The mixing temperature in this section should be from about 160° C. to 270° C., preferably from about 170° C. to 260° C.

Another section of the mixing extruder includes melt compression prior to extrusion through a die plate. The melt compression can be accomplished, for example, with the co-rotating twin screw extruder, or melt compression can be done via a de-coupled process, such as a single screw extruder or a melt gear pump. At the end of the compression section, the composition is discharged through a die plate.

Alternatively, the functionalized propylene-based polyolefin-metal salts can be blended with polypropylene to produce the improved polyolefin resin blends of the present invention.

The compositions of the present invention allow the manufacture of articles, especially articles formed as sheet or film, that exhibit a combination of increased (1) gloss, (2) scratch resistance, and (3) clarity compared to conventional articles formed predominantly of non-neutralized polypropylene materials. A particularly important use for sheet material relates to its application to automotive exterior body panels, whereby the need for spray painting in the manufacture of such panels can be reduced or eliminated. Thus, another aspect of the present invention is a method for making an article of manufacture including the step of shaping, providing, or molding the described polyolefin resin blend into a desired configuration and shape of the article of manufacture.

The gloss of a surface is determined by the amount of light that is scattered when light hits the surface of the object. The sheet material of this invention preferably exhibits a 20° gloss of at least about 60 when measured in accordance with ASTM D-2457-97. Particularly preferred sheet materials of this invention exhibit a 20° C. gloss of at least about 80 when measured by this technique.

Scratch resistance is an indication of the hardness of the surface when measured in accordance with the Ford Laboratory Test Method BN 108-13. The apparatus uses a pneumatically driven sledge with five metal fingers (250 mm long). One end of each metal finger is fixed while the other end is supplied with an interchangeable scratch pin with a stainless steel tip (1.0 mm in diameter). The pins are loaded with different weights to exert standard forces on the surface of the test material. The loads are increased, as allowed in the Ford Laboratory Test Method, in order to meet the required scratch forces on the surface of the samples. The loading forces are reported in Newtons (N). The compositions of the present invention exhibits a scratch resistance under a load of 15 Newtons of about 4.0 or less, preferably about 3.5 or less, and more preferably about 3.0 or less and under a load of 10 Newtons of about 3.5 or less, preferably about 3.0 or less, and more preferably about 2.5 or less.

Clarity is defined as a low haze number, measured in accordance with ASTM D-1003-00. The compositions of the present invention preferably exhibit a haze of less than about 50%, more preferably less than about 30%. Low haze or high transparency provides depth of color and gloss in pigmented compositions, as well as metallic and pearlescent brightness and clarity in special effects colors. Automotive articles formed from the colored compositions of the invention are preferably similar to the adjacent painted surfaces of a vehicle, or can replace exterior painted surfaces, even for the highly desirable metallic colors. Thus, substantially paint-free or paint-free colored articles can be prepared according to the invention that essentially or completely match an adjacent painted surface.

The present invention also includes the resultant shaped blends and the finished articles made therefrom. Given the excellent properties of the present invention noted previously, the polyolefin resin blends of the invention are suitable for many specialized applications. For example, this material can be shaped into components used in many interior and exterior automobile parts. Shaping, as used herein, could include any type of molding and/or extruding, with the injection molding of a blend of the recited components being preferred. Such finished articles have excellent scratch and mar resistance, which are important properties in certain commercial applications, though it should be understood that any given blend according to the invention need not have the improved properties in all of these categories.

The fabricated articles of this invention can be prepared by any known thermoplastic fabrication methods, and particularly by known thermoplastic molding methods, such as injection, compression, blow, spin/rotational, reaction injection and molding techniques.

Exemplary articles include a film, sheet, or a coating, preferably an extruded film, sheet, or coating. In one preferred embodiment, the extruded film, sheet, or coating is deposited over a substrate such as an automotive part, e.g., a bumper, fascia, dashboard, or the like. One preferred article is an extruded film or sheet that includes two or more layers with the polymer blend including polypropylene ionomer of the invention being disposed furthest from the substrate to which the film is applied. Preferably, the polymer blends of the invention are translucent or transparent (clear), preferably transparent.

The articles formed from this invention may be made by co-extrusion with a core layer and a skin layer, or a core layer between two skin layers. In the latter embodiment, the skin layers may be the same or different. The core layer is formed of a polypropylene composite material. The skin layer is formed of a mixture of a propylene-based polyolefin metal salt and property modifying agents. The propylene-based polyolefin metal salt provides the co-extruded sheet article with high gloss and scratch resistance, comparable to a conventional coated product. It is preferable that the polypropylene composite material is compounded with either an elastomer or property modifying agents, or both, thus providing flexibility and impact resistance to the core layer. Suitable examples of the elastomer contained in the polypropylene composite material include an ethylene/alpha-olefin copolymer, a terpolymer of ethylene, an alpha-olefin and a diene, and a styrene thermoplastic elastomer. Additional layers may be incorporated into the composite structure, if desired.

If desired, the co-extrusion method disclosed in U.S. Pat. No. 5,972,520 is suitable and is expressly incorporated herein by reference thereto. Other co-extrusion techniques can be used such as multiple extrusion heads, or a multiple manifold flow divider and a single die head. The first and second layers are co-extruded with one another and formed of compatible materials so as to form a bond between the first and second layers without the use of an adhesive. As a result, the present invention does not require the formation of separate sheets (through extrusion or otherwise) and the separate bonding of the sheets as is commonly used in lamination.

Other manufacturing techniques for applying a coating to a substrate are generally known and may be used with the invention, including vacuum-forming the coating over a premolded metallic or polymeric body panel or, in an alternative embodiment, placing the coating within a mold and injecting a polymeric substrate behind it.

A part may be made by thermoforming the co-extruded sheet or film of this invention. Thermoforming is the process of heating a plastic material in sheet form to its particular processing temperature and forming the hot and flexible material against the contours of a template by mechanical or pneumatic means. When held to the shape of the template and allowed to cool, the plastic retains the shape and detail of the template. The process of thermoforming is well known to those skilled in the art and is described in detail in Throne, "Thermoforming" (ISBN 0-02-947610-0) Hanser Publications, New York (1987).

The thermoforming process typically involves (1) heating the sheet in a separate oven and then transferring the hot sheet to a forming press; (2) using automatic machinery to combine heating and forming in a single unit; or (3) a continuous operation feeding off a roll of thermoplastic material or directly from the exit of an extruder die (post-forming); or any combinations thereof.

The composite materials can be used for making a variety of large structural parts, for example, co-extruded profiles; appliance cabinets, door liners, and counter or desk tops; electrical equipment housings; engine covers and body panels for jet skis and snowmobiles; boat hulls and boat decks as well as boat engine covers, consoles, and hatches; indoor and outdoor hot tubs, showers, and bathtubs; pickup truck caps and camper tops; automobile parts, such as body panels; body parts and engine shrouds for golf carts, all-terrain vehicles, lawn mowers, and lawn tractors; and agricultural equipment; computer housings; or the like; or any part thereof. "Motor vehicle," as used herein, includes any type of motorized vehicle, including rocketry, jet skis, snowmobiles, automotive vehicles including trucks and cars, boats, lawn mowers, lawn tractors, golf carts, all-terrain vehicles, or the like. "Structural component," as used herein, refers to any load-bearing portion, such as the hull or deck on a boat, the chassis or load-bearing components of an automobile, or the like. "Body panel," as used herein, is meant to include traditional motor vehicle components, such as a bumper, fascia, or the like, as well as pickup truck caps, camper tops, consoles, hatches, doors, and the like.

As used herein, unless otherwise stated the term "percent" refers to weight percent of a polymer in the polymeric portion, that is, not including inorganic fillers and the like, of a composition or blend.

As used herein, the term "polymer" includes homopolymers, copolymers (including terpolymers), and the like. "Propylene polymer" and "ethylene polymer" can refer to a polymer including any amount of propylene units and ethylene units, respectively. In one embodiment, the term includes polymers wherein propylene is the monomer present in a concentration of at least about 50 percent.

As used herein, the term "functionalized polyolefin," for example "functionalized polypropylene," includes both ionomers, copolymers of olefins and hydrophilic moiety-containing monomers, polyolefins grafted with an organic monomer including a hydrophilic moiety, and polyolefin-metal salts.

As used herein, the term "polyolefin-metal salt" with a specific monomer preceding it, for example a "propylene-based polyolefin-metal salt," is a reaction product of a propylene-containing polymer and an organic monomer containing a hydrophilic moiety which is at least partially neutralized with a metal ion. Typically, a propylene-based polyolefin-metal salt is a polymer wherein the polyolefin monomer, e.g., polypropylene, is present in a polyolefin at a concentration of at least about 80 percent, preferably at least about 95 percent, before functionalizing the polyolefin, and where the polyolefin has then been optionally but preferably functionalized with one or more hydrophilic moieties such as carboxylic acid-containing or other hydrophilic moiety-containing unsaturated monomers, i.e., maleic anhydride. This functionalized polyolefin is advantageously at least partially neutralized with a metal ion.

As used herein, the term "propylene-based polyolefin-metal salt," "propylene metal salt," "polypropylene metal salt," or the like, is a reaction product of a propylene-containing polymer and an organic monomer containing a hydrophilic moiety, which reaction product is at least partially neutralized with at least one metal ion. This is a specific type of polyolefin-metal salt as defined above.

As used herein, the term "styrenic block ionomer" is a reaction product of one or more styrenic block copolymers functionalized with a polar group, which reaction product is at least partially neutralized with a metal ion. Styrenic block copolymers include a styrenic block segment and an elastomeric block segment that may or may not be hydrogenated, i.e., optionally, and in one embodiment preferably, hydrogenated. The polar group is preferably an alpha, beta-ethylenically unsaturated carboxylic acid, or the anhydride thereof.

As used herein, the term "semi-crystalline" typically means that the crystallinity is at least about 30%, preferably at least about 50% and more preferably to about 80%.

The term "substantially free," as used herein, means that the excluded component is present in an amount of less than about 10 weight percent of the limited material, e.g., substantially paint-free, preferably less than about 5 weight percent, and more preferably less than about 1 weight percent of the stated material. In one preferred embodiment, "substantially free" means less than 0.1 weight percent of the undesired material. "Completely free" means no more than a trace amount of any such materials, preferably no detectable amounts.

The term "about," as used herein, should generally be understood to refer to both numbers in a range of numerals. Moreover, all numerical ranges herein should be understood to include each whole integer within the range.

EXAMPLES

These and other aspects of the present invention may be more fully understood with reference to the following examples, which are merely illustrative of preferred embodiments of the present invention and are not to be construed as limiting the invention.

Materials Used in the Examples:

| | |
|---|---|
| PPMA-1, wt % | Propylene functionalized with maleic anhydride (MA) with MFR = 50 dg/min; MA content is 0.5 wt % |
| PPMA-2, wt % | Propylene functionalized with maleic anhydride (MA) with MFR = 110 dg/min; MA content is 1.0 wt % |
| Metal ion, pph | Metal ion containing compound such as zinc acetate |
| B-225, pph | Irganox B-225 |

The significance of the symbols used in these examples, the units expressing the variables mentioned, and the methods of measuring these variables, is explained below. The test specimens were prepared by injection molding using a HPM Command 90 Injection Molding Machine (HPM Corporation of Mt. Gilead, Ohio, a division of Taylor's Industrial Services LLC) at a melt temperature of 200° C. and a mold cavity temperature of 18° C.

| | |
|---|---|
| MFR (dg/min) | Melt Flow Rate, measured in dg/min at 230° C., under a load of 2.16 kg, according to ASTM D-1238-01 |
| Flexural modulus (kpsi) | Flexural Modulus, measured as 1000 pounds per square inch at 23° C. and a test speed of 12.7 mm/min and a rectangular test specimen of dimensions ⅛" × ½" × 5", according to ASTM D-790-00 |
| Tensile Strength (psi) | Tensile strength, measured as pounds per square inch at 23° C., according to ASTM D-638-01 |
| HDT, ° C. | Heat deflection temperature, deflection temperature under a flexural load of 66 psi, according to ASTM D-648-01 |

TABLE 1

| | Example 1 | Example 2 | Comp. Example 1 |
|---|---|---|---|
| PPMA-1, wt % | 100 | — | 100 |
| PPMA-2, wt % | — | 100 | — |
| Metal ion, pph | 2 | 2 | — |
| B-225, pph | 0.4 | 0.4 | 0.4 |
| MFR, dg/min | 13.7 | 28.9 | 50.1 |
| Flex modulus, kpsi | 287 | 288 | 239 |
| Tensile strength, psi | 6216 | 6344 | 5351 |
| HDT, ° C. | 100.6 | 101.8 | 91.3 |

The results in Table I demonstrate the improved properties of the present invention over the unmodified polypropylene grafted with maleic anhydride in Comparative Example 1. The flex modulus, tensile strength and HDT results in Examples 1–2 show surprising and unexpected improvement compared to a conventional polypropylene polymer that has not been neutralized according to the invention.

Although preferred embodiments of the invention have been illustrated in the accompanying drawings and described in the foregoing Detailed Description of the Preferred Embodiments, it will be understood that the invention is not limited to the embodiments disclosed but is capable of numerous rearrangements and modifications of parts and elements without departing from the spirit of the invention. It will be understood that the chemical details of every design and embodiment may be slightly different or modified by one of ordinary skill in the art without departing from the blends and methods taught by the present invention.

What is claimed is:

1. An article formed from a polyolefin blend comprising a propylene-based polyolefin-metal salt that is a reaction product of a propylene-containing polymer consisting essentially of at least one propylene homopolymer or one or more propylene-based copolymers of propylene and no more than about 20 mole percent ethylene or other alpha-olefins, which polymer is functionalized with a first hydrophilic moiety comprising at least one carbonyl group and at least one metal ion present in an amount sufficient to at least partially neutralize the first hydrophilic moiety, and a property-modifying agent.

2. The article of claim 1, further comprising an ethylene-based polyolefin-metal salt that is a reaction product of a copolymer of ethylene functionalized with a second hydrophilic moiety and at least one metal ion present in an amount sufficient to at least partially neutralize the second hydrophilic moiety.

3. The article of claim 1 wherein the metal salt is present in an amount of about 1 to 99 weight percent and the property-modifying agent is present in an amount of about 1 to 20 weight percent, with the remainder being one or more polymers or salts thereof, one or more additives, or both, and the total weight percents adding to 100%.

4. The article of claim 3, further comprising from about 1 to 70 weight percent of a semi-crystalline polyolefin, from about 0.1 to 50 weight percent of a styrenic block ionomer, or a combination thereof.

5. A molded article comprising the article of claim 1, wherein the propylene-based polyolefin-metal salt is present in an amount sufficient to increase the scratch resistance and clarity of the molded article compared to a molded article that is free of propylene-based polyolefin-metal salt.

6. An extruded article comprising the article of claim 1, wherein the propylene-based polyolefin-metal salt is present in an amount sufficient to increase the scratch resistance and clarity of the extruded article compared to an extruded article that is free of propylene-based polyolefin-metal salt.

7. A thermoformed article comprising the article of claim 1, wherein the propylene-based polyolefin-metal salt is present in an amount sufficient to increase the scratch resistance and clarity of the thermoformed article compared to a thermoformed article that is free of propylene-based polyolefin-metal salt.

8. The article of claim 1 formed as a coating or a coextruded, multi-layer film or sheet.

9. The article of claim 8, wherein the coextruded, multi-layer film or coating forms an outermost layer of the article.

10. The article of claim 1, wherein the blend further comprises a polymeric metal salt that is a reaction product of a random styrenic copolymer which is comprised of at least one unsaturated dicarboxylic acid derivative incorporated into the styrene backbone; and at least one metal ion present in an amount sufficient to at least partially neutralize each unsaturated dicarboxylic acid derivative.

11. The article of claim 10, wherein the random styrenic copolymer comprises styrene-maleic anhydride.

12. The article of claim 1, wherein each metal ion independently comprises lithium, sodium, potassium, magnesium, calcium, barium, lead, tin, zinc, aluminum or a combination thereof.

13. The article of claim 2, wherein the first and second hydrophilic moieties each comprise an ethylenically unsaturated carboxylic acid monomer.

14. The article of claim 13, wherein the first and second hydrophilic moieties each independently comprise methacrylic acid, acrylic acid, maleic anhydride, or a mixture thereof.

15. The article of claim 1, further comprising an impact modifier in an amount sufficient to increase impact resistance of the article.

16. The article of claim 15, wherein the impact modifier is present in an amount from about 1 to about 20 weight percent and comprises a styrenic block copolymer, an hydrogenated styrene butadiene random copolymer, or mixtures thereof.

17. The article of claim 3, wherein the property-modifying agent includes a mineral filler present in an amount from about 2 to about 18 weight percent and comprises talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof.

18. The article of claim 1, wherein the property-modifying agent comprises one or more processing aids, slip agents, oils, waxes, flame retardants, antistatic agents, lubricants, foaming agents, silicone oils, antioxidants, ultraviolet light stabilizers, hindered amine light stabilizers, ultraviolet light absorbers, mineral filler, coloring agents, clarifying agents, nucleating agents, or any combination thereof.

19. The article of claim 1 prepared by a method which comprises:

providing a polymer component comprising at least one propylene-based polyolefin-metal salt that is a reaction product of a propylene-containing polymer functionalized with a first hydrophilic moiety and at least one metal ion present in an amount sufficient to at least partially neutralize the first hydrophilic moiety at a sufficiently high temperature to at least partially melt the propylene-based polyolefin-metal salt, and a property-modifying agent; and forming the polymer component into a portion of an article having an external surface, wherein the portion forms a surface of the article that when subjected to a 20 Newton load has less than about a 2.5 on the scratch rating scale and has no ribbing or tearing.

20. The article of claim 19, which further comprises melt blending into the polymer component a polymeric metal salt that is a reaction product of a random styrenic copolymer which is comprised of at least one unsaturated dicarboxylic acid derivative incorporated into the styrene backbone and at least one metal ion present in an amount sufficient to at least partially neutralize each unsaturated dicarboxylic acid derivative, and wherein each metal ion independently comprises lithium, sodium, potassium, magnesium, calcium, barium, lead, tin, zinc, aluminum or a combination thereof.

21. The article of claim 19, which further comprises providing the polymer component with an impact modifier which comprises a styrenic block copolymer, an hydrogenated styrene butadiene random copolymer, or mixtures thereof, in an amount sufficient to increase impact resistance of the article.

22. The article of claim 19, wherein the forming of the portion comprises co-extruding a multi-layer film adjacent to the remainder of the article such that the layer including the polymer component forms an external surface of the film and article.

23. The article of claim 1, wherein the first and optional second hydrophilic moieties are free of phosphorous and the neutralized polymer is phosphonate free.

* * * * *